Nov. 4, 1969  L. JEAN-MARIE FRINDEL  3,476,908
ARC SPOT-WELDING
Filed May 16, 1966

Inventor
Louis Jean-Marie Frindel
By
Karl W. Flocks
Attorney

United States Patent Office 3,476,908
Patented Nov. 4, 1969

3,476,908
ARC SPOT-WELDING
Louis Jean-Marie Frindel, Meudon, France, assignor to Nord-Aviation Societe Nationale de Constructions Aeronautiques, Paris, Seine, France, a joint-stock company of France
Filed May 16, 1966, Ser. No. 550,258
Claims priority, application France, May 25, 1965, 18,422
Int. Cl. B23k 9/00, 9/28, 11/10
U.S. Cl. 219—127         2 Claims

ABSTRACT OF THE DISCLOSURE

A welding machine for arc spot-welding having a hollow clamping nozzle, the lower portion of which is swivelly joined to the upper portion to equalize pressure against a workpiece. The lower portion is made of beryllium oxide and has lower marginal outflow ports for escape of shielding gas. A workpiece backup lever is operated by a pneumatic cylinder.

---

The present invention relates to arc welding and more particularly to arc spot-welding in an inert atmosphere.

In carrying out an arc spot-weld, with access to one side only, it is sought to reduce as far as possible the dimension of the core of the molten zone which constitutes the spot, in order to reduce deformation. In this case however, if the two elements of the assembly, for example sheets, are not perfectly in contact, the molten core may not be common to the two sheets to be welded together and there is obtained at the desired point a sticking effect, an imperfect weld, or even no weld at all.

It is therefore necessary to apply the two elements of the assembly to be spot-welded closely against each other, but the pressure to be applied must be fairly high, and it happens that the insulating ceramic nozzle on which the force is applied at the extremity of the torch is damaged, especially if an alignment defect occurs at the moment of clamping or if the material of which it is made is not sufficiently strong, mechanically and thermally.

The present invention has for its objective to provide a spot-welding device in an inert gas which offers the welder the following advantages:

The elements of the assembly are pressed strongly together at the moment of effecting a spot-weld;

A current-modulation programme causes the arc to strike for the time strictly necessary for the formation of a molten zone core which is as small as possible;

The heat liberated in the molten zone is rapidly evacuated, and there is thus avoided all crystalline disturbance of the structure of the adjacent zones by the contact of a nozzle of special ceramic material;

This nozzle is articulated by a ball-joint, which ensures perfect bearing on the surface of the assembly, even if the torch is applied with a slight obliquity;

The spherical element of the joint which forces together the elements of the assembly is made of material having a high melting point, its heat conductivity and its electrical resistance are high, and its strength under compression is excellent;

The ceramic material which constitutes this element of the universal joint, always bearing on the contact surface and not on a sharp edge, is protected against accidental damage due to the force which presses the nozzle against the assembly;

The force is distributed over the assembly by means of a supporting plate.

Other characteristic features and advantages will be brought out in the description which follows below, made with reference to the accompanying drawings and showing by way of indication but not in any limitative sense, one form of embodiment of the invention.

Figure 1:
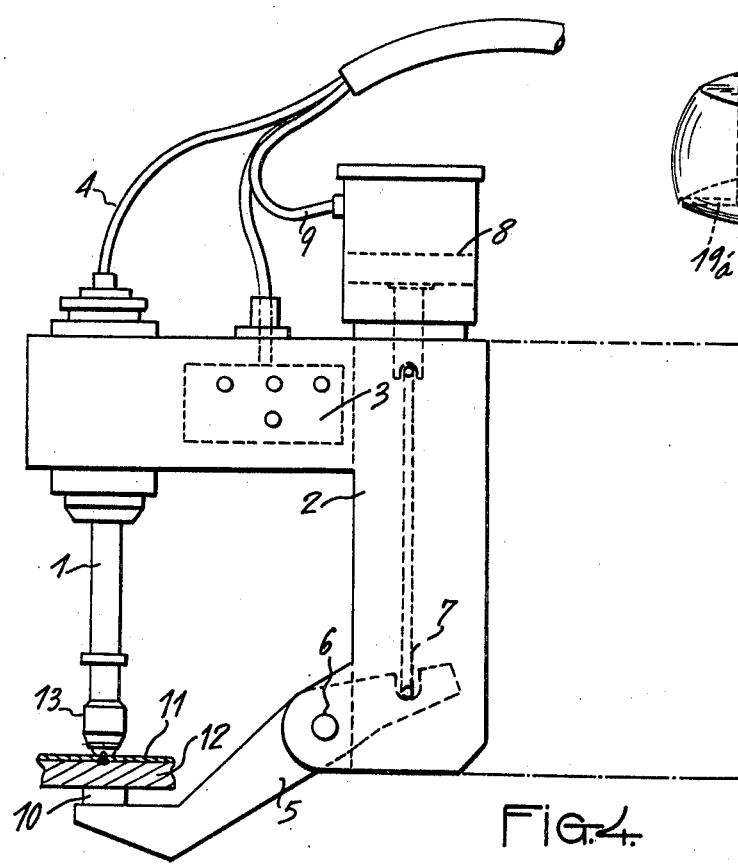
Figure 3:
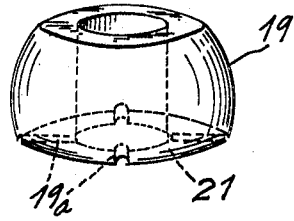
Figure 2:
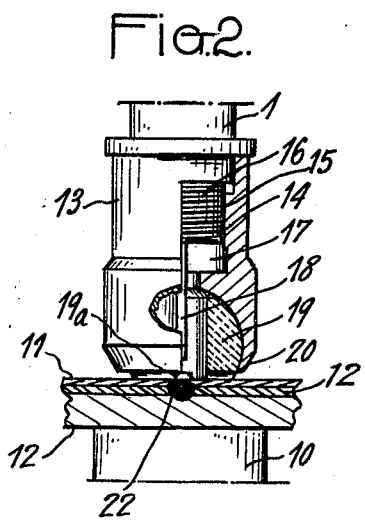
Figure 4:
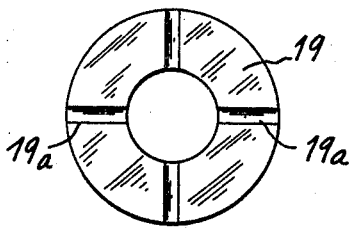

In the drawings:
FIG. 1 is a side view of an apparatus in the welding position;
FIG. 2 is a detail view with parts broken away, of the torch shown in FIG. 1;
FIGS. 3 and 4 are perspective views to a larger scale of one part of the nozzle.

In FIG. 1, there is shown a welding torch 1 carried by a frame 2 in the form of a jig. On this frame 2 are shown a control panel 3 and the intake for inert gas through the conduit 4.

The frame 2 carries a lever 5 articulated at 6 and actuated by a push-rod 7, which is in turn operated by the jack 8 to which compressed air is fed by the conduit 9.

Under a force of 20 daN. to 200 daN. (decanewtons) which is transmitted to it by the jack 8 and the crank-arm 7, the lever 5 forces a supporting plate 10 against the assembly constituted by the elements 11, 12, 12' ... which are thus pressed between the plate 10 and the nozzle 13 of the torch 1. The assembly is thus gripped between the arms of a pincers in the form of a C.

The nozzle 13 comprises a swivel-joint element 14, screwed at 15 on the extremity 16 of the torch; this element is hollow to permit the free passage 17 for the inert gas and for the tungsten electrode 18, and terminates in a spherical cavity into which is introduced a mating ball-type swivel-joint element 19, held finally in position by insetting the collar 20.

When the clamping force is applied between the nozzle 13 and the anvil 10, the swivel-joint element 19 moves spontaneously in its housing in such manner that the contact surface 21 is truly applied flat against the surface of the element 11. Grooves 19a provided in this surface 21 permit the inert gas introduced at 17 around the electrode 18 to escape to the exterior.

The swivel-joint element 14 is preferably made of copper and the swivel-joint element 19 of glucina, or beryllium oxide, having the chemical formula BeO, the characteristics of which are as follows:

Melting temperature higher than 2500° C.;
Compression strength: 150 hectobars;
Thermal conductivity: 0.4 calorie per ° C. per second and per sq. cm./cm., at 20° C.;
Electrical resistivity: $10^{14}$ ohms/sq. cm./cm. at 20° C., 800 ohms/sq. cm./cm. at 2100° C.;
Hardness in the Mohs' scale: 9.

The properties of the material with which the swivel joint is made according to the invention satisfy perfectly the conditions desirable in order to obtain very localized spot-welds 22 without adversely affecting the metallurgical structure of the adjacent zones.

The control devices which initiate the successive operations of a welding cycle, in particular the current-modulation programme, the means for rapid application of pressure to the nozzle, the movements and the rapid removal of the torch are already known and it is therefore unnecessary to describe them here, although they are essential to the operation of an apparatus according to the invention.

It will of course be understood that the present invention has been described above purely by way of explanation and not in any limitative sense, and that any modification of detail may be effected in accordance with its spirit, without thereby departing from the scope of the invention.

I claim:
1. A welding machine for arc spot-welding comprising electrode means for heating the welding zone, means for clamping together the elements to be assembled around the spot weld including
a clamping nozzle comprising a swivel-joint element with a refractory supporting surface and having a central bore around said electrode means, and mounted in said nozzle, said swivel-joint element being of beryllium oxide and having half-channels disposed radially around said central bore through which an inert gas blown around said electrode means escapes,
and a supporting plate in an opposing clamping position to said clamping nozzle on which rest the elements to be assembled on their side opposite to that on which said heating means acts.

2. A welding machine for arc spot-welding comprising electrode means for heating the welding zone,
means for clamping together the elements to be assembled around the spot weld including
a clamping nozzle comprising a swivel-joint element with a refractory supporting surface and having a central bore around said electrode means and mounted in said nozzle, said swivel-joint element being of beryllium oxide,
and a supporting plate in an opposing clamping position to said clamping nozzle on which rest the elements to be assembled on their side opposite to that on which said heating means acts.

References Cited
UNITED STATES PATENTS

| | | | |
|---|---|---|---|
| 2,346,088 | 4/1944 | Shobert | 219—119 |
| 2,680,797 | 6/1954 | McDaniel | 219—127 X |
| 3,049,607 | 8/1962 | Stuben et al. | 219—89 |
| 3,061,714 | 10/1962 | Van Sciver et al. | 219—127 |
| 2,538,959 | 1/1951 | Ballard. | |
| 3,141,782 | 7/1964 | Livey et al. | 106—55 |
| 3,165,417 | 1/1965 | Turner. | |

JOSEPH V. TRUHE, Primary Examiner

R. F. STAUBLY, Assistant Examiner

U.S. Cl. X.R.

106—55; 219—75, 89, 130